United States Patent [19]

Proner et al.

[11] Patent Number: 5,624,717

[45] Date of Patent: Apr. 29, 1997

[54] PROCESS FOR COATING OR HARDFACING A PART BY MEANS OF A PLASMA TRANSFERRED ARC

[75] Inventors: Alain Proner, Lirac; Maurice Ducos, Mornas; J. Phillipe Dacquet, Bollene, all of France

[73] Assignee: SNMI-Societe Nouvelle de Metallisation Industrie, Avignon Cedex, France

[21] Appl. No.: 501,974

[22] Filed: Jul. 12, 1995

Related U.S. Application Data

[63] Continuation of Ser. No. 154,555, Nov. 19, 1993, abandoned.

[30] Foreign Application Priority Data

Nov. 27, 1992 [FR] France ................. 92 14310

[51] Int. Cl.$^6$ ............... B05D 1/32; C23C 4/08; B23K 9/00; H05H 1/48
[52] U.S. Cl. ............... 427/448; 427/455; 427/580; 219/121.37; 219/121.47
[58] Field of Search ............... 427/448, 449, 427/451, 453, 455, 456, 580, 564; 219/121.46, 121.47, 121.59, 121.37

[56] References Cited

U.S. PATENT DOCUMENTS

| | | | |
|---|---|---|---|
| 3,715,790 | 2/1973 | Reinberger | 427/448 |
| 3,896,244 | 7/1975 | Ellis et al. | 427/451 |
| 4,015,100 | 3/1977 | Gnanamuthu et al. | 219/121.61 |
| 4,157,923 | 6/1979 | Yen et al. | 427/455 |
| 4,219,717 | 8/1980 | Kuhnen | 219/121.61 |
| 4,241,110 | 12/1980 | Ueda et al. | 427/448 |
| 4,291,448 | 9/1981 | Cretella et al. | 427/448 |
| 4,686,348 | 8/1987 | Johns et al. | 427/448 |
| 4,782,206 | 11/1988 | Ayres et al. | 219/76.14 |
| 4,905,886 | 3/1990 | Kennedy et al. | 427/448 |
| 5,070,228 | 12/1991 | Siemers et al. | 219/121.46 |
| 5,079,043 | 1/1992 | Lambert | 427/448 |
| 5,293,026 | 3/1994 | Dennis et al. | 219/121.59 |
| 5,352,538 | 10/1994 | Takeda et al. | 428/553 |
| 5,368,947 | 11/1994 | Denny | 428/553 |
| 5,429,883 | 7/1995 | Sasaki et al. | 148/328 |

FOREIGN PATENT DOCUMENTS

| | | | |
|---|---|---|---|
| 2816283 | 10/1978 | Germany | 427/448 |
| 4021466 | 1/1992 | Germany | 427/448 |

OTHER PUBLICATIONS

Patent Abstracts of Japan, vol. 11, No. 250 (M–616)(2697), Aug. 14, 1987, JP-A-62 057 770, Mar. 13, 1987 "Powder Build-up Welding Method and its Equipment".

E. J. Hellund, *The Plasma State*, Reinhold Pub. Corp., N.Y. 1961 (no month), see chapt. 3 "Arc Plasma", pp. 33–64.

*Primary Examiner*—Marianne Padgett
*Attorney, Agent, or Firm*—Oblon, Spivak, McClelland, Maier & Neustadt, P.C.

[57] ABSTRACT

The invention relates to a process for coating or hardfacing recharging a part by means of a plasma transferred arc.

According to the process, on the part (1) to be coated or hardface is deposited at least one weld bead (7a, 7b, 7c) of said material solely by means of the plasma transferred arc (5), by moving the plasma relative to the part at a speed of 1.5 to 50 m/min and using a power of the plasma such that the surface of the part is melted over a thickness at the most equal to 0.5 mm and so that the enlargement of the grains in the melted area does not exceed 10%, without cooling the part during recharging.

5 Claims, 4 Drawing Sheets

PROCESS FOR COATING OR HARDFACING A PART BY MEANS OF A PLASMA TRANSFERRED ARC

This application is a Continuation of application Ser. No. 08/154,555, filed on Nov. 19, 1993, now abandoned.

BACKGROUND OF THE INVENTION

1. Field of the Invention

The present invention relates to a process for coating or hardfacing a metal part by the deposition of a metal using the plasma transferred arc method. It more particularly applies to the coating or hardfacing of parts such as the valves of internal combustion engines.

2. Discussion of Background

Coating/hardfacing procedures consist of producing relatively thick deposits of a material on a substrate in order to give the latter the qualities inherent in the deposited material.

According to this procedure, between the substrate and the deposited material a metallurgical bond is produced by welding, which makes it necessary to heat the substrate in order to melt its surface during the supply of the coating material in the melted state. Thus, in the substrate appears a thermally influenced zone in the vicinity of the deposit and a dilution of the substrate in the deposited material.

Hardfacing operations of this type can be carried out with conventional welding equipment such as oxyacetylene torches, as well as equipment using an electric arc such as tungsten inert gas (TIG torches), metal inert gas (MIG torches) and plasma transferred arcs (PTA). These welding equipments are continuously or discontinuously supplied with filler material, in the form of powders, rods or wires.

When use is made of the plasma transferred arc method, the transferred arc constitutes the heating element of the recharging material and the surface of the part forming the substrate. The part to be treated is raised to a positive potential compared with the cathode of the torch and the plasma jet is then entirely traversed by electric current between the torch and the substrate, transmitting to the latter the energy necessary for heating and localized melting of the zone to be coated or hardfaced. The filler material is melted on the surface of the part in order to form a liquid bath, which is continuously renewed during the displacement of the part beneath the torch. The surface melting of the substrate permits a metallurgical bond identical to that encountered in welding processes.

With the presently used, conventional equipment, whose nozzles have a diameter of 2.5 to 4.5 mm, the material is deposited in the form of a weld bead by moving the part relative to the torch at a relative torch-part speed between 0.08 and 1.10 m/min and using average current densities of 5 to 12 amp/mm² at the nozzles.

With such energy levels, in the case of small parts such as valves, it is necessary to cool the part during deposition in order to avoid a modification of its properties due to the heating. This cooling is generally carried out by placing the part on a support internally cooled by a circulation of water.

By means of these methods, it is generally possible to obtain weld beads having a rounded profile, i.e. having a deposited material increased thickness and relatively high average dilution rates of e.g. approximately 8 to 12%.

SUMMARY OF THE INVENTION

The present invention relates to a hardfacing or coating process using the plasma transferred arc method, which makes it possible to limit the deposited increased thickness, avoid cooling of the part during deposition and limit the dilution rate.

According to the invention, the process of coating or hardfacing a metal part by the deposition of a material by means of a plasma transferred arc consists of depositing on the part to be recharged at least one weld bead solely by means of the plasma transferred arc, by moving the plasma relative to the part at a speed of 1.5 to 50 m/min and using a plasma power such that the surface of the part is melted over a thickness at the most equal to 0.5 mm and the enlargement of the grains in the melted area does not exceed 10%, without cooling the part during recharging.

In this process, the use of a relative displacement of the part with respect to the plasma of a very rapid nature permits a better use of the plasma by limiting the thermally influenced zone, thereby avoiding an enlargement of the grains in the influenced zone and the energy of the heating action is easily dissipated without it being necessary to cool the part during hardfacing.

According to the invention, the movement or displacement speed v of the plasma relative to the part is chosen as a function of the nature of the material constituting the part, the melted thickness p during the hardfacing operation and the diameter d of the plasma spot on the part.

This speed v corresponds to the formula:

$$v = \frac{d}{5p^2} \times \frac{\lambda}{\rho C_p}$$

in which
d is the spot diameter,
p is the melted thickness in the part,
$\rho$ is the density of the material of the part,
$\lambda$ is the thermal conductivity of said material and
$C_p$ is the specific heat of said material.

In order not to exceed melted thicknesses of 0.5 mm, the speed must be in the range 1.5 to 50 m/min.

In this process, the plasma power is also chosen so as not to exceed a melted thickness of 0.5 mm and so as not to obtain a significant enlargement of the grains.

This can be obtained by using power levels such that they satisfy the following relation:

$$\frac{UI}{vd} \geq 10^7 \; W \cdot s \cdot m^{-2}$$

in which U is the voltage applied to the plasma torch (in V), I is the intensity of the current (in amp), v is the relative torch-part speed (in m/s) and d is the diameter of the spot (in m).

Generally, on the part to be coated/hardfaced are deposited several juxtaposed weld beads with a partial overlap of the beads or more frequently a spiral bead with a partial overlap of the turns in order to form on the part a deposit having the desired width. In this case, the beads or turns generally have a width below 2 mm.

In order to produce these very thin beads or turns, the energy of the plasma is concentrated onto a very small diameter area, which makes it possible to easily bring about the surface melting of the part and the coating material by using a relatively high displacement speed of the plasma with respect to the part. Therefore the energy supplied to the surface of the part can be easily dissipated by the latter.

Moreover, due to the fact that the deposit is in the form of juxtaposed turns or beads, it is possible to limit the excess thickness of the deposit and economize on coating material.

The very significant confinement of the electric arc in the nozzle, whose diameter is less than 2 mm, leads to very high energy densities (above 30 A/mm²), which makes it possible to obtain relative torch-part speeds exceeding 3.5 m/min and obtain excellent metallurgical characteristics at the thermally influenced zone not exceeding 0.5 mm and at the level of the deposit structures which are extremely fine.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
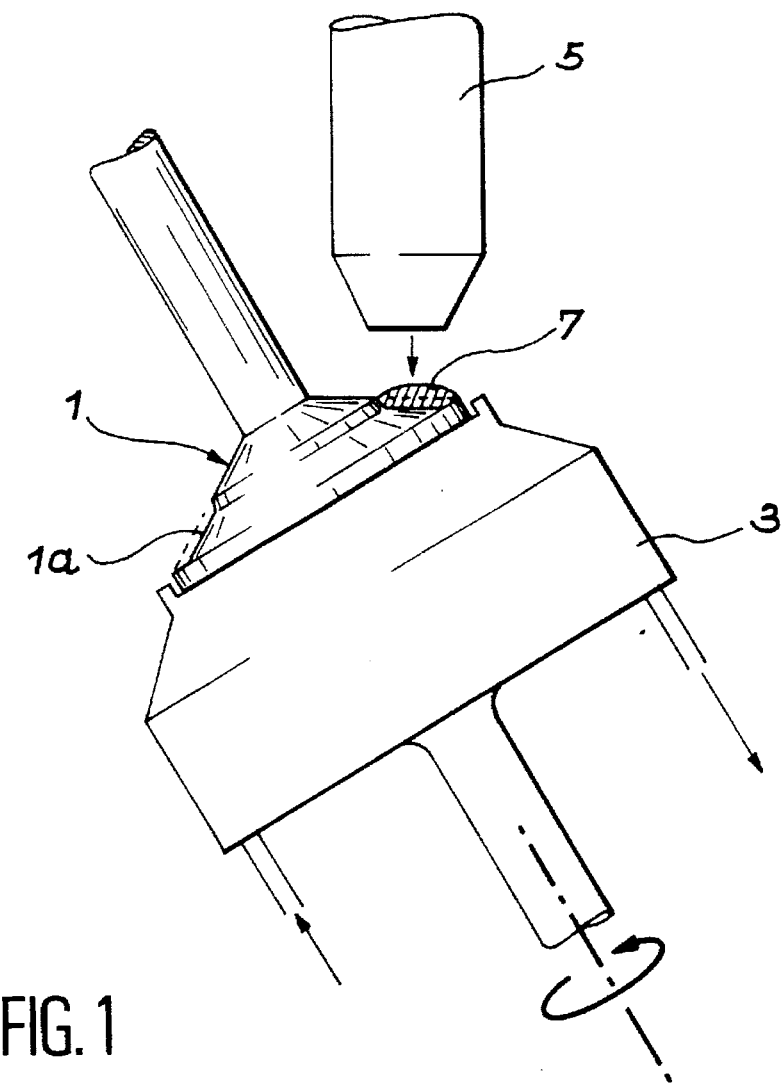
FIG. 1 Diagrammatically an installation for hardfacing a valve according to the prior art.

FIG. 1 very diagrammatically shows a hardfacing or coating installation incorporating the part 1 to be hardfaced, the support 3 for the part being hardfaced and the plasma torch 5 used for the hardfacing.

In this embodiment, the part 1 is constituted by an engine valve having a diameter of 34 mm, which has a rounded groove 1a in which is deposited the coating material 7 generally formed by a cobalt-based deposit.

In order to carry out this coating operation, use is made of a plasma transferred arc torch 5 and the deposition conditions are as follows:

nozzle diameter: 3 mm,
intensity: 120 amps
voltage: 30 V
rotation speed of support 3: 10 r.p.m.,
relative torch-part speed: 1.06 m/min,
deposited weight: 7 g per valve, and
deposition time: 15 s per valve.

For this deposit, the valve 1 is turned on the support 3, which is internally cooled by the circulation of water in order to deposit in the groove 1a a rounded weld bead 7. The energy supplied by the plasma to the surface of the part 1 causes a very significant heating of the latter, which is cooled by the support 3.

Figure 2:
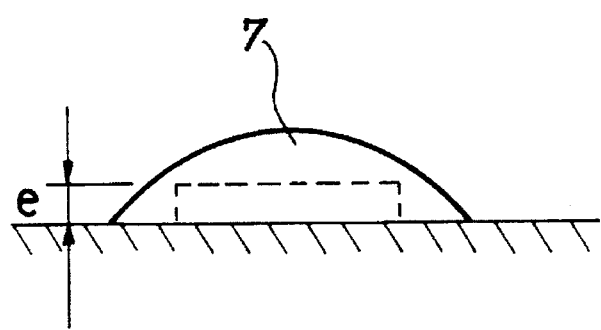
FIG. 2 The shape of the deposit obtained with FIG. 1.

FIG. 2 shows the shape of the weld bead obtained. It can be seen that the weld bead 7 has a significant increased thickness in the centre compared with the thickness e required for the deposit.

FIG. 1 also shows that the surface which is to be covered with the recharging material has a special profile which had to be produced by machining prior to the deposition operation, in order to take account of the shape of the weld bead and keep the filler material in molten form.

Figure 3:
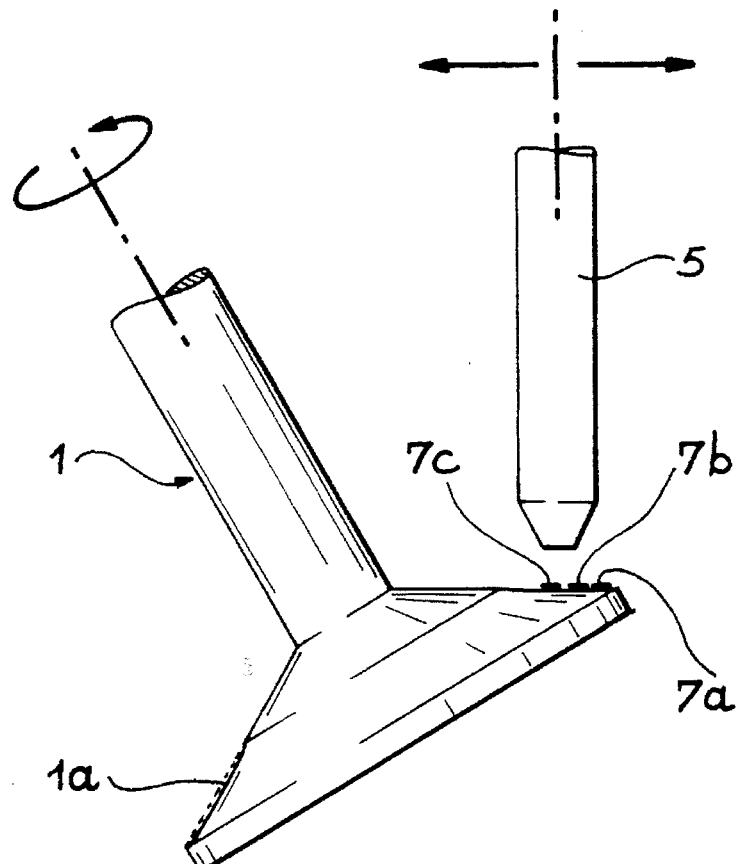
FIG. 3 A recharging installation according to the invention.

FIG. 3 shows a coating or hardfacing installation using the process according to the invention. In FIG. 3 the valve 1 is rotated by an appropriate device without being placed on a cooling table 3 and has a surface 1a to be covered with material.

In FIG. 3 a weld bead is produced in the form of coils or turns 7a, 7b, 7c by moving the plasma torch 5 in order to produce a spiral bead with a partial overlap of the turns and using the following operating conditions:

nozzle diameter: 1.5 mm.
spot diameter: 2.3 mm.
intensity (I): 60A.
voltage (U): 30 V.
rotation speed: 33 r.p.m.,
relative torch-part speed (v): 3.52 m/min,
weight deposited on valve: 2 g,
deposition time: 9 s per valve.

Figure 4:
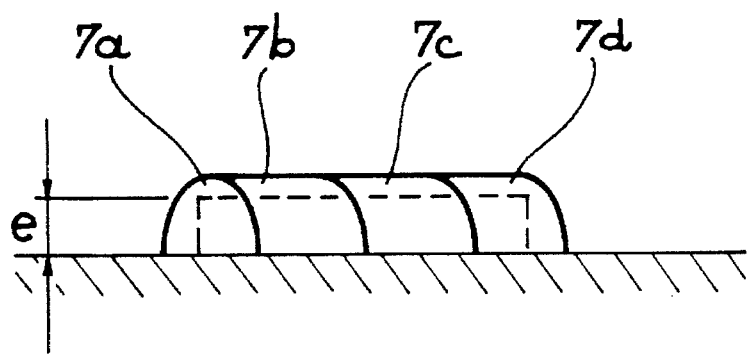
FIG. 4 The shape of the deposit obtained with the installation of FIG. 3.

The deposit obtained has the profile shown in FIG. 4. It is possible to see in FIG. 4 that the production of a spiral weld bead makes it possible to significantly limit, e.g. to 0.1 mm, the increased material thickness deposited as compared with the desired thickness e and thus economize on material and subsequent machining operations.

Figure 5:
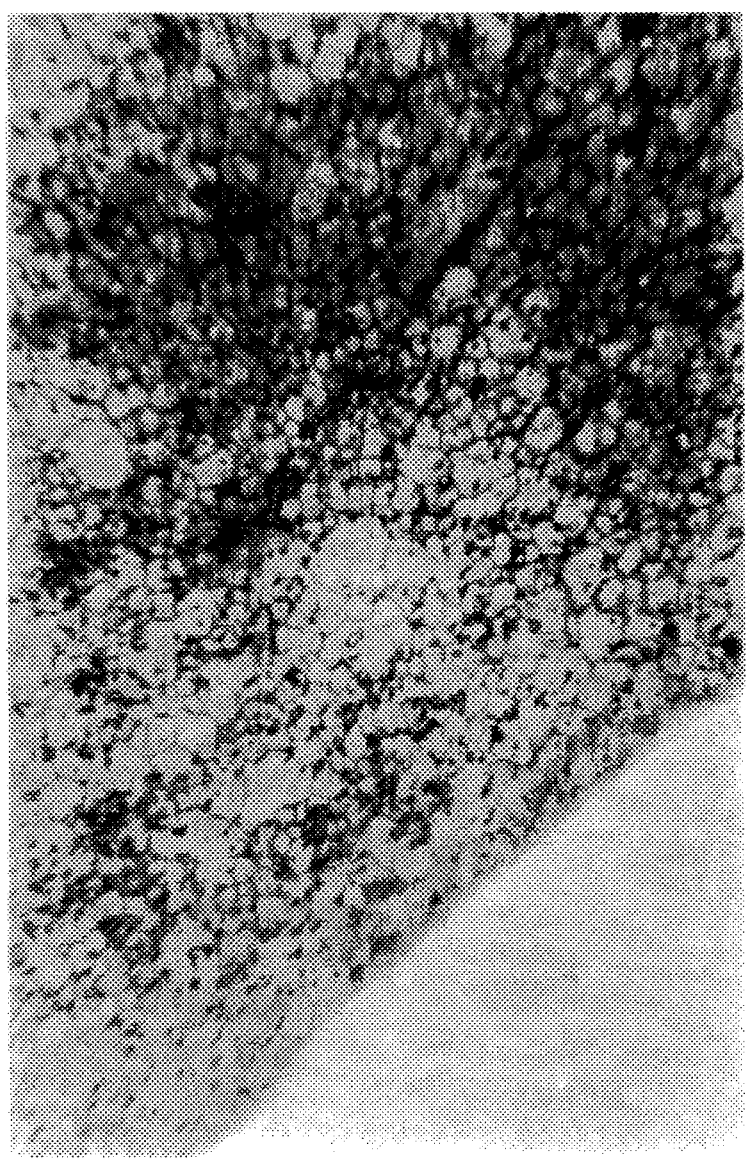
FIGS. 5 & 6 Micrographs respectively showing the structure of the thermally influenced zone in the coated parts according to the process of the invention and according to the prior art process.

Moreover, the thickness of the melted zone on the part p is 0.17 mm and the enlargement of the grain s in the thermally influenced zone Z does not exceed 10%, as can be seen in FIG. 5.

Figure 6:
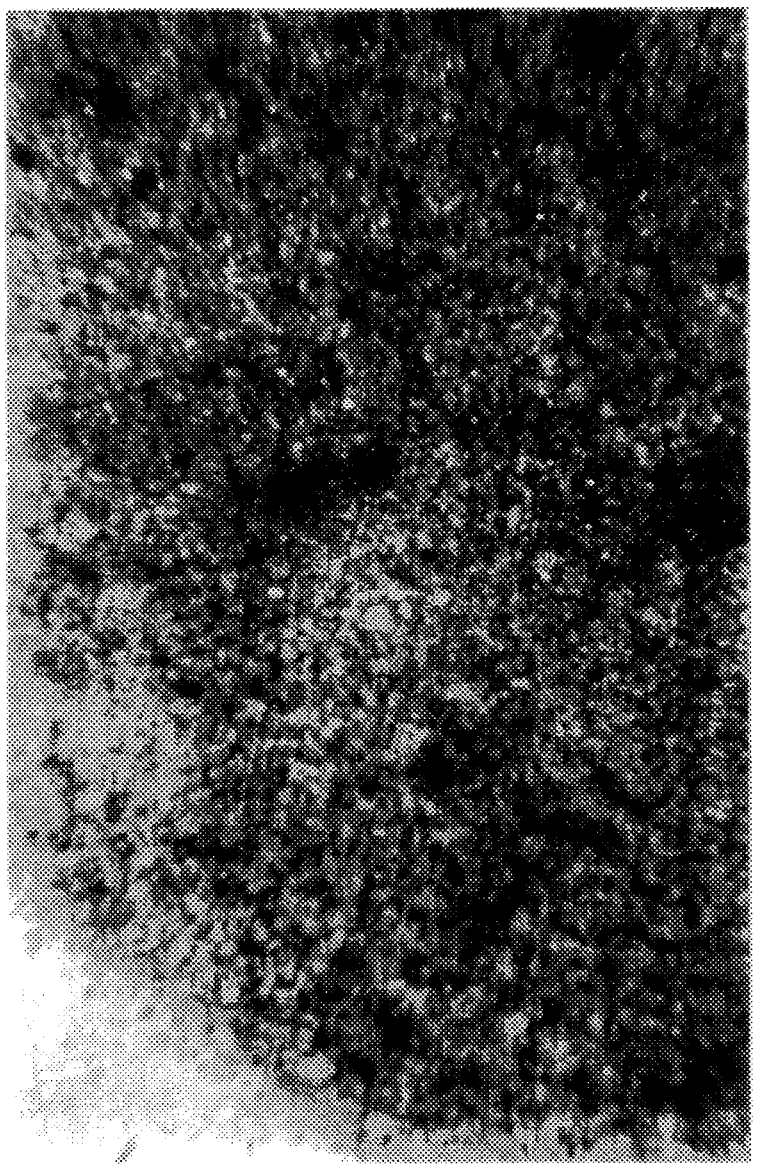

FIG. 6 shows for comparison purposes the structure of the part obtained with the prior art plasma torch and it can be seen that there is a much greater enlargement of the grains in the thermally influenced zone Z in this case.

In the above-described example, the power of the plasma UI is 1800 W and the ratio $$\frac{UI}{vd}$$

is equal to $1.349 \times 10^{-7}$ Ws/m².

We claim:

1. Process for hardfacing a metal part by depositing a material on the metal part, comprising:

depositing on the part to be hardfaced at least one weld bead of said material solely by means of a plasma transferred arc utilizing a plasma torch, by displacing the plasma with respect to the part at a speed of 1.5 to 50 m/min and using a plasma power such that a surface of the part is melted over a thickness at most equal to 0.5 mm and enlargement of grains in a melted area does not exceed 10% as a result of the process for hardfacing, without cooling the part during hardfacing, whereby a thermally influenced zone is limited during hardfacing and enlargement of grains in the influenced zone is also limited, and energy of the heating action is dissipated without requiring cooling of the metal part during hardfacing; and wherein the displacement speed v of the plasma relative to the metal part during hardfacing is chosen to satisfy the formula:

$$v = \frac{d}{5p^2} \cdot \frac{\lambda}{\rho C_p}$$

in which:

d is a plasma spot diameter on the metal part;
p is the melted surface thickness of the metal part;
ρ is a density of a material of the metal part;
λ is thermal conductivity of said material of the metal part; and
$C_p$ is a specific heat of said material of the metal part.

2. Process according to claim 1, wherein on the part to be hardfaced are deposited several juxtaposed weld beads with partial overlap of the beads or a spiral bead with a partial overlap of adjacent turns.

3. Process according to claim 2, wherein the part is a valve and in that each weld bead or each turn has a width below 2 mm.

4. Process according to any one of the claims 1 to 3, wherein the power of the plasma satisfies the following relation:

$$\frac{UI}{vd} \geqq 10^7 \; W \cdot s \cdot m^{-2}$$

in which U is the voltage applied to a plasma torch (in V), I is the intensity of the current (in amps), v is the relative torch-part speed (in m/s) and d is a diameter of a plasma spot on the part (in m).

5. The process of claim 1, further including utilizing a plasma torch with a nozzle having a diameter of less than 2 mm.

* * * * *

UNITED STATES PATENT AND TRADEMARK OFFICE
CERTIFICATE OF CORRECTION

PATENT NO. : 5,624,717
DATED : April 29, 1997
INVENTOR(S) : Alain PRONER, et al.

It is certified that error appears in the above-indentified patent and that said Letters Patent is hereby corrected as shown below:

On the title page, in Item [75], the third inventor's name should read:

--J. Philippe Dacquet--

Signed and Sealed this

Twenty-ninth Day of July, 1997

Attest:

BRUCE LEHMAN

*Attesting Officer*    *Commissioner of Patents and Trademarks*